Dec. 17, 1968   A. GOLOFF ET AL   3,416,391
MISALIGNMENT COMPENSATING CAM FOLLOWER
Filed Sept. 19, 1966   3 Sheets-Sheet 1

INVENTORS
ALEXANDER GOLOFF
DENNIS D. FEUCHT

BY
*Fryer, Tjensvold, Feix & Phillips*
ATTORNEYS

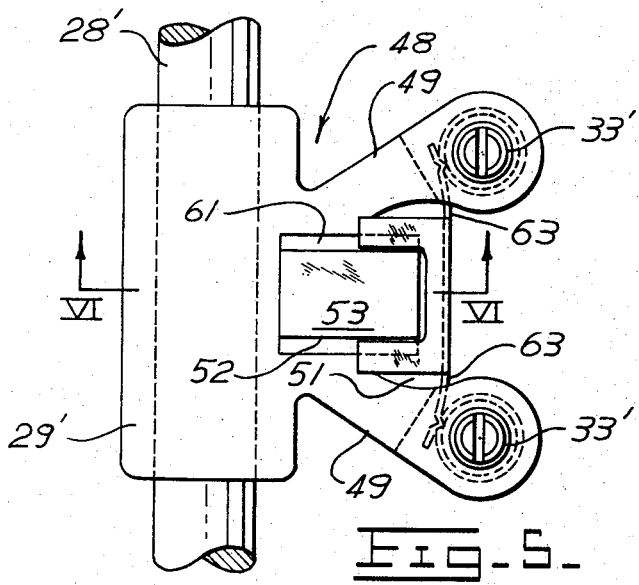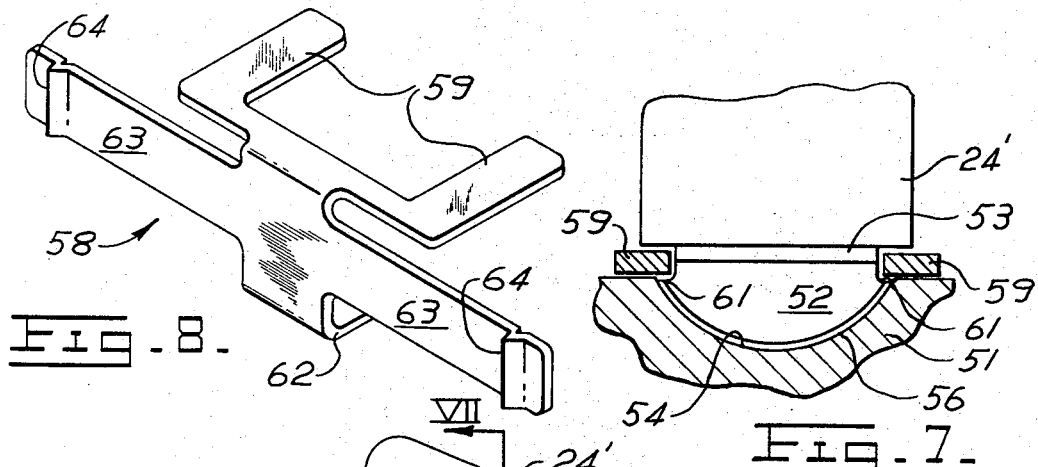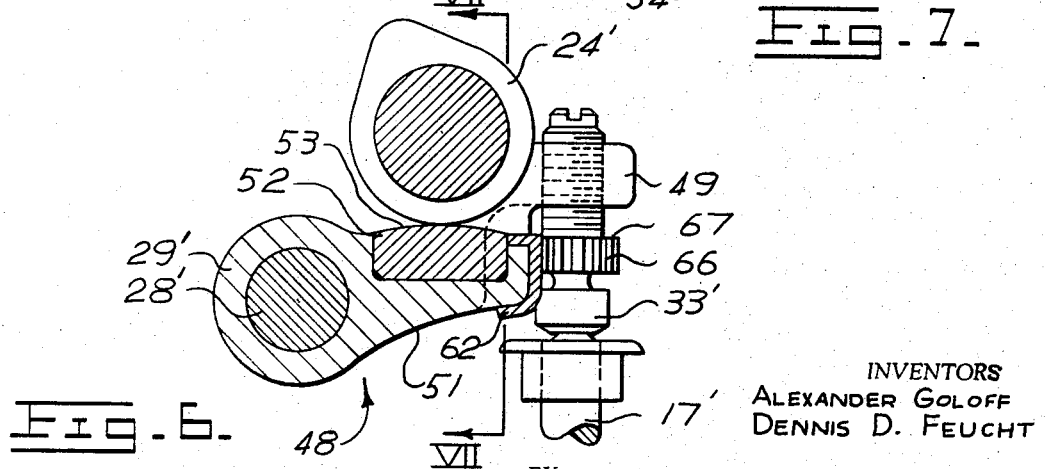

United States Patent Office 3,416,391
Patented Dec. 17, 1968

3,416,391
MISALIGNMENT COMPENSATING CAM FOLLOWER
Alexander Goloff, East Peoria, and Dennis D. Feucht, Peoria, Ill., assignors to Caterpillar Tractor Co., Peoria, Ill., a corporation of California
Filed Sept. 19, 1966, Ser. No. 580,363
9 Claims. (Cl. 74—569)

ABSTRACT OF THE DISCLOSURE

In a mechanism having a rotatable eccentric cam operating a rocker arm, a self-adjusting cam follower is situated therebetween and has a first surface which is automatically maintained in aligned contact with the cam. For this purpose the cam follower has an opposite second surface which is cylindrical and which abuts a matching cylindrical surface on the rocker arm whereby the cam follower may shift thereon to maintain the line contact.

---

This invention relates to cam operated mechanisms and more particularly to a pivotaing rocker arm cam follower which automatically maintains an optimum alignment with the associated cam.

Mechanisms which have a cam bearing against a rocker arm cam follower are extensively used for converting rotary motion into translational movement. Internal combustion engines, for example, usually have a series of such cam and rocker arm combinations for actuating the intake and exhaust valves at the engine cylinders. Such mechanisms are frequently subject to excessive wear resulting from slight misalignments of the abutting surfaces of the cam and cam follower.

It is usually advantageous to form the cam and cam follower bearing surfaces with a flat cross section so that loading is distributed along a line transverse to the cam rather than being concentrated at a single point thereon. Flat cam surfaces have the further advantage of being more economical to manufacture. However any slight deviation from a parallel relationship between the cam and cam follower surfaces, such as may result from wear in the associated pivots and bearings, unbalanced loading, or other causes, converts the desired line contact into a point contact and wearing of one side of the cam and cam follower is accelerated. Such wear complicates maintenance and may result in a frequent need for replacement parts.

Prior attempts to reduce this form of wearing have included the use of a more complex joint at the pivoted end of the rocker arm so that the arm may rotate to a limited extent about its own longitudinal axis. This is intended to allow self alignment of the cam follower surface on the arm with the contiguous cam surface. However the additional freedom of movement may be incompatible with the operational functions of the arm. Further, such an arrangement is ineffective if there is any substantial torque force exerted on the arm such as may arise from offset elements operated by the arm.

It is a common practice in engine design, for example, to operate two spaced apart valves with a single cam and rocker arm situated therebetween, the arm being forked in order to contact both valve stems. Any imbalance in the loading on the two forks of the arm generates a torque force thereon. If the arm is rotatable about its own axis as discussed above, severe edge wearing of the cam and cam follower can occur and the operation of the engine can be deleteriously affected.

The present invention is a rocker arm construction having a self-adjusting element which forms the cam follower surface and which maintains the desired line contact with the adjacent cam irrespective of misalignments of the other components of the mechanism.

Accordingly it is an object of this invention to provide a more durable and precise rocker arm cam follower.

It is an object of the invention to provide a rocker arm cam follower which is self-aligning in the presence of torque forces applied to the rocker arm.

It is still another object of the invention to avoid edge loading and consequent uneven wearing of a cam and cam follower.

It is a further object of the invention to provide means for maintaining a line contact between a cam and cam follower rocker arm while constraining said arm against rotational movement about its own longitudinal axis.

The invention, together with further objects and advantages thereof, will best be understood by reference to the following specification in conjunction with the accompanying drawings, of which:

FIGURE 5 is a plan view of a rocker arm and actuating cam embodying a modified form of the invention;

FIGURE 6 is an elevation section view taken along line VI—VI of FIGURE 5 further illustrating the modified embodiment of the invention;

FIGURE 7 is an elevation section view taken along line VII—VII of FIGURE 6; and

FIGURE 8 is a perspective view of a spring clip element of the embodiment of FIGURES 5 to 7 shown separately from the other components thereof.

Figure 1:
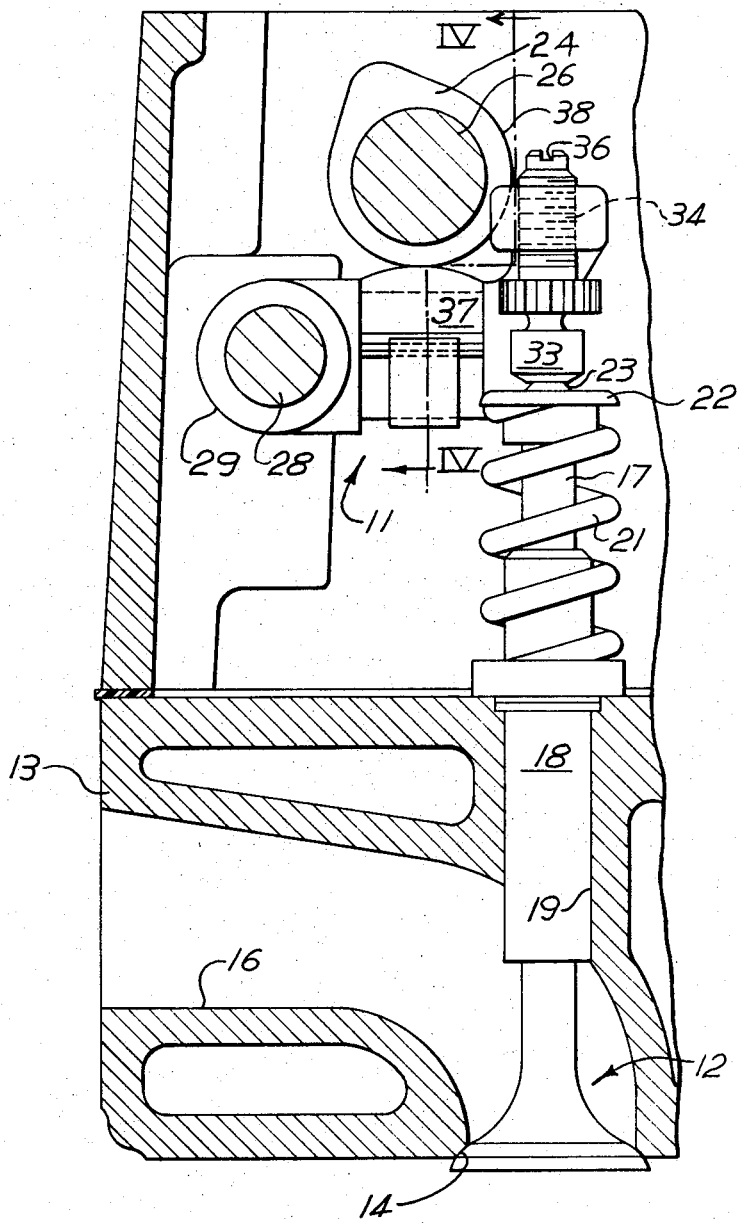
FIGURE 1 is an elevation section view of a portion of the internal combustion engine showing a valve thereof with the cam and cam follower arm for operating the valve.

Referring now to the drawing and more particularly to FIGURE 1 thereof, the self-aligning cam follower is shown embodied in a rocker arm 11 of the type which operates intake and exhaust valve, such as valve 12, of an internal combustion engine.

Each such valve 12 is disposed in the conventional manner in the head member 13 of the engine to coact with a valve seat 14 at the inner end of a passage 16 in the head. Each valve 12 has a stem 17 which extends upward through a guide bushing 18 in a vertical bore 19 in the head 13 above the valve seat 14. The valve 12 is held in a normally closed position by a compression spring 21 disposed coaxially around the upper portion of valve stem 17 between the head 13 and a keeper ring 22 at the upper end of the stem. The valve 14 may be opened, at the appropriate period of the engine cycle, by a downward force on the upper end 23 of the valve stem 17 which overcomes the upward force of the spring 21.

The valve stem 17 is depressed to open the valve 12 at predetermined times in the engine cycle by the action of rocker arm 11 which is in turn controlled by a cam section 24 of a rotating overhead camshaft 26. Camshaft 26 is driven from the engine crankshaft through timing gear mechanism well understood within the art.

Considering now the detailed structure of rocker arm 11 and associated elements of the engine, a first end of the arm is pivoted to a fixed shaft 28 situated above head 13 and to one side of the upper ends 23 of the valve stems 17. To better resist torque forces which may be applied to the arm 11, the pivot connection to shaft 28 is formed by a transverse sleeve section 29 at the end of the arm which is an integral element thereof and which fits coaxially on the shaft.

Figure 2:
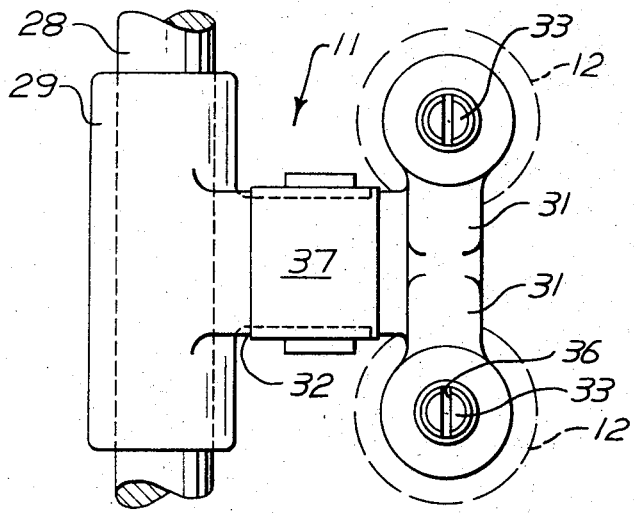
FIGURE 2 is a plan view of the cam and rocker arm cam follower of FIGURE 1.

Referring now to FIGURE 2 in conjunction with FIGURE 1, the rocker arm 11 is adapted to operate two adjacent valves 12 simultaneously. For this purpose the end of the arm 11 remote from sleeve section 29 has a pair of extensions 31 which project outward and upward from the central section 32 of the arm at opposite sides thereof. As best shown in FIGURE 1 in particular, each such extension 31 carries a tappet 33 which projects downward to contact the upper end 23 of a separate one of the valve stems 17. Each tappet 33 is threadably engaged in a bore 34 in the arm extension 31 and has a transverse slot 36 in the upper end to facilitate the adjustment of valve clearances.

Cam 24 bears against a self adjusting saddle element 37, which will be hereinafter described in greater detail, on the central section 32 of rocker arm 11 and is contoured to depress the arm once during each revolution of the cam. The arm 11 then pivots downwardly about shaft 28 and, through the tappets 33, momentarily opens each of the two associated valves 12 in the course of each revolution of cam 24.

Figure 3:
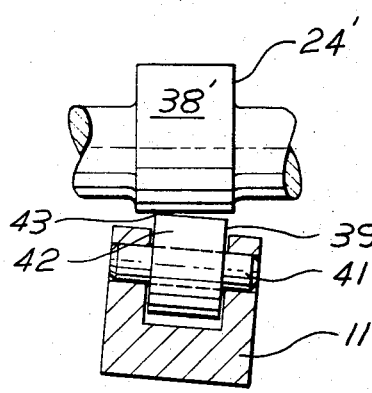
FIGURE 3 shows a conventional roller cam follower and illustrates the misalignment problems commonly encountered therewith.

A prominent difficulty with cam driven mechanisms of this general type has been rapid wearing resulting from misalignment of the bearing surface 38 of the cam and the adjacent cam follower surface. FIGURE 3 shows a common prior art construction in which the cam follower is a wheel 39 rotatably mounted on the rocker arm 11' on an axle pin 41. Misalignment or edge loading occurs when the contact between the bearing surface 38' of the cam 24' and the cam follower surface 42 of the wheel 39 is limited to a single point 43 rather than extending across the entire width of the cam or cam follower. While such edge loading can result from several causes as hereinbefore discussed, it is a particularly severe problem if the rocker arm 11' must work against an offset load such as the two engine valves in the system hereinbefore described. Referring now again to FIGURE 2, it may be seen that any difference in the counter forces exerted against the two rocker arm extensions 31 by the two valves 12 will tend to twist the rocker arm 11 about the longitudinal axis of its central section 32. In the absence of corrective means this will tend to bring about the misalignment condition illustrated in FIGURE 3.

Figure 4:
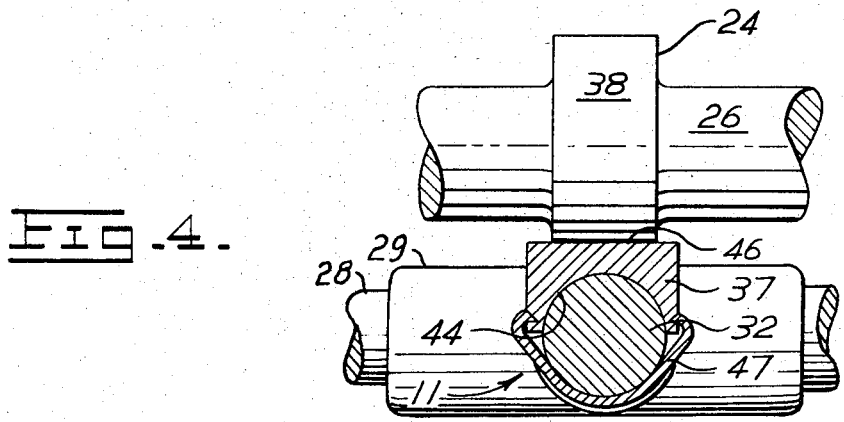
FIGURE 4 is a partial elevation section view taken along line IV—IV of FIGURE 1 further illustrating the structure of the cam follower and the relationship of the cam thereto.

In the present invention the saddle element 37 functions to correct any tendency toward misalignment from this, or other, causes and maintains the optimum line contact between the cam and cam follower. Referring now to FIGURE 4, the central section 32 of rocker arm 11 is formed to have a convex cylindrically curved cross section at the region below cam 24 and saddle element 37 has a conforming concave cylindrical undersurface 44 which fits thereagainst. Saddle 37 has a top surface 46 of flat cross section which contacts the bearing surface 38 of the cam 24 and which maintains a line contact therewith inasmuch as the saddle is free to shift angularly about the rocker arm section 32. To insure retention of the saddle 37 on the arm 11, a spring clip 47 extends around the underside thereof and is engaged with both sides of the saddle.

In operation, the cam 24 exerts a pressure on the top surface 46 of saddle 37 which, in addition to operating the rocker arm and valves as hereinbefore described, causes the saddle to shift angularly about the rocker arm when necessary to maintain the saddle surface 46 in alignment with the cam surface 38. Thus the loading on the cam surface 38 and the cam follower surface 46 remains evenly distributed across the two elements irrespective of misalignments in the other components of the mechanism.

A key feature of the mechanism is the ability of the saddle 37 to move angularly on the arm 11. This may be provided for through structure which differs from that of the embodiment described above. FIGURES 5 through 8, for example, illustrate a modification of the invention in which the self adjusting element has a reversed curvature with respect to the rocker arm while effecting a similar result.

Referring now to FIGURES 5 and 6 in conjunction, the rocker arm 48 in this modification is again pivoted to a fixed shaft 28' by a transverse sleeve section 29' at one end of the arm and has a pair of extensions 49 which diverge therefrom and carry tappets 33' for actuating two valve stems 17' as in the previously described embodiment. A shelf portion 51 extends from sleeve section 29' between extensions 49 to carry a self adjusting anvil insert 52 which forms the cam follower surface 53.

Referring now to FIGURE 7, rocker arm shelf 51 has a longitudinal groove 54 in the upper surface to receive the anvil 52, the groove being of cylindrical configuration in cross section. Anvil 52 has a conforming convex cylindrical undersurface 56 so that it is free to shift angularly about its longitudinal axis. The upper surface 53 of anvil 52 is linear in cross section to provide a line contact with the cam 24'.

Anvil 52 is held on arm 48 by a spring clip 58 which is shown separated from the other elements of the arm in FIGURE 8. Clip 58 has a pair of parallel members 59 which, as shown in FIGURE 7, extend along opposite sides of groove 54 and overlap the groove a small distance at each side above shoulders 61 formed along the sides of the anvil 52. With anvil 52 centered in groove 54, the shoulders 61 are spaced a small distance below members 59 so that the clip 58 will not interfere with the angular shifting of the anvil.

Clip 58 is held on the rocker arm 48 by an angled tab section 62 which, as shown in FIGURE 6, extends downward at the end of shelf 51 and back thereunder for a short distance. Retention of the clip 58 is further provided for by a pair of arm sections 63 which, as shown in FIGURE 5, extend from opposite sides of the tab section 62 to the tappets 33'. The arms 63 are slightly flexed in order to exert a spring force against the tappets 33' to aid in holding the clip 58 in position. The clip 58 is further locked in position by crimps 64 near the ends of arms 63 which enter serrations 66 on a flange 67 of each tappet 33'. The crimps 64 serve the further function of resisting rotation of the threaded tappets 33' and thus help to maintain the selected valve adjustment.

In operation, the pressure of cam 24' turns the anvil 52 angularly within groove 54 when necessary to equalize the cam pressure along the line of contact between the cam and the anvil and accelerated wearing at an edge zone of the cam and cam follower surface 53 is avoided as in the previously described embodiment.

It will be apparent that the invention is applicable to cam driven mechanisms other than the specific type of engine valve actuator herein described.

What is claimed is:

1. A cam follower for a rotating cam comprising, in combination, a rocker arm pivoted for oscillation about an axis substantially parallel to the axis of rotation of said cam, and a self adjusting element disposed between said cam and said rocker arm, said element having a first surface forming a line contact with said cam and a curved second surface contacting said arm whereby said element may shift angularly relative to said arm to maintain a fixed alignment with said cam.

2. A cam follower as defined in claim 1 wherein said second surface of said self adjusting element and a surface of said rocker arm abutted thereagainst have conforming cylindrical curvatures.

3. A cam follower as defined in claim 1 and comprising the further combination of a clip extending between said self-adjusting element and said arm for retaining said element thereon.

4. A cam follower as defined in claim 1 wherein said second surface of said self-adjusting element is circularly curved in cross section and extends into a conforming curved seat formed on said rocker arm to provide for said angular shifting of said element.

5. A cam follower as defined in claim 1 wherein said rocker arm has a convex cylindrically curved surface in the region of said cam and wherein said second surface of self-adjusting element has a conforming concave curvature and fits against said convex section of said arm.

6. A cam follower as defined in claim 5 and comprising the further combination of a clip extending around said rocker arm and having ends engaged with opposite sides of said self-adjusting element to retain said element on said arm.

7. A cam follower as defined in claim 1 wherein said rocker arm has a groove of circularly curved cross section in the region of said cam, and wherein said second surface of self-adjusting element has a conforming convex configuration and extends into said groove.

8. A cam follower as defined in claim 7 wherein said self-adjusting element has a shoulder formed along each side thereof and extending parallel to said groove, and comprising the further combination of a clip having portions extending along opposite sides of said groove over said shoulders of said element and having an additional portion engaging said rocker arm to retain said element thereon.

9. A cam follower as defined in claim 1 wherein the second end of said rocker arm carries a pair of spaced apart tappets for operating a pair of valves of an internal combustion engine, said tappets being situated one on each side of said rocker arm and being equidistantly spaced from said self-adjusting element whereby unbalanced loading of said arm by said valves is minimized and compensated for.

References Cited

UNITED STATES PATENTS

| 2,226,985 | 12/1940 | Spencer | 74—559 |
| 2,508,557 | 5/1950 | Wood | 74—569 |

FRED C. MATTERN, JR., *Primary Examiner.*

F. D. SHOEMAKER, *Assistant Examiner.*

U.S. Cl. X.R.

74—559